(12) United States Patent
Terry

(10) Patent No.: US 8,711,692 B2
(45) Date of Patent: Apr. 29, 2014

(54) MULTIPLEXING CHANNELS BY A MEDIUM ACCESS CONTROLLER

(75) Inventor: Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 92 days.

(21) Appl. No.: 12/603,974

(22) Filed: Oct. 22, 2009

(65) Prior Publication Data

US 2010/0040088 A1   Feb. 18, 2010

Related U.S. Application Data

(63) Continuation of application No. 10/832,678, filed on Apr. 27, 2004, now Pat. No. 7,609,632, which is a continuation of application No. 09/569,731, filed on May 12, 2000, now Pat. No. 6,738,368.

(51) Int. Cl.
  *H04L 12/26* (2006.01)
  *H04L 12/28* (2006.01)
  *H04L 12/66* (2006.01)
  *H04J 3/22* (2006.01)

(52) U.S. Cl.
  USPC ............ 370/230; 370/351; 370/463; 370/465

(58) Field of Classification Search
  CPC ............ H04L 2012/6448; H04L 29/04; H04L 2012/6456; H04L 2012/6464; H04L 1/1864
  USPC ......... 370/229–231, 235, 238, 310, 342, 431, 370/464, 351, 389, 436, 441–444, 462, 370/478–480, 498, 537
  See application file for complete search history.

(56) References Cited

U.S. PATENT DOCUMENTS

| | | |
|---|---|---|
| 4,630,261 A | 12/1986 | Irvin |
| 5,278,828 A | 1/1994 | Chao |
| 5,317,562 A | 5/1994 | Nardin et al. |
| 5,420,861 A * | 5/1995 | De La Bourdonnaye ..... 370/229 |
| 5,528,591 A | 6/1996 | Lauer et al. |
| 5,666,348 A | 9/1997 | Thornberg et al. |
| 5,729,540 A | 3/1998 | Wegrzyn |
| 5,742,588 A | 4/1998 | Thornberg et al. |
| 5,754,541 A | 5/1998 | Glisic et al. |
| 5,802,310 A | 9/1998 | Rajaraman |

(Continued)

FOREIGN PATENT DOCUMENTS

| | | |
|---|---|---|
| EP | 0430570 | 6/1991 |
| EP | 0707386 | 4/1996 |

(Continued)

OTHER PUBLICATIONS

TS 25.321 V2.0.0 (Apr. 1999), "MAC Protocol Specification", Apr. 23, 1999, 3rd Generation Partnership Project (3GPP), Technical Specification Group (TSG) RAN, Working Group 2, all pages.*

(Continued)

*Primary Examiner* — Omar Ghowrwal
(74) *Attorney, Agent, or Firm* — Volpe and Koenig, P.C.

(57) ABSTRACT

A code division multiple access (CDMA) communication device comprises a medium access controller (MAC) configured to receive data from a plurality of channels. Each channel is associated with a priority and an identifier. The MAC is further configured to multiplex the data of the plurality of channels for transmission over a CDMA channel based on the priority.

21 Claims, 7 Drawing Sheets

(56) References Cited

U.S. PATENT DOCUMENTS

| | | | |
|---|---|---|---|
| 5,828,677 A * | 10/1998 | Sayeed et al. | 714/774 |
| 5,838,677 A | 11/1998 | Kozaki et al. | |
| 5,850,394 A | 12/1998 | Sekine et al. | |
| 5,872,769 A | 2/1999 | Caldara et al. | |
| 6,078,568 A | 6/2000 | Wright et al. | |
| 6,091,725 A | 7/2000 | Cheriton et al. | |
| 6,105,070 A | 8/2000 | Gaylord | |
| 6,122,253 A | 9/2000 | Jones | |
| 6,154,500 A * | 11/2000 | Dorenbosch et al. | 375/259 |
| 6,157,628 A | 12/2000 | Uebayashi et al. | |
| 6,236,646 B1 | 5/2001 | Beming et al. | |
| 6,285,662 B1 | 9/2001 | Watanabe et al. | |
| 6,330,603 B1 | 12/2001 | Seki et al. | |
| 6,418,136 B1 | 7/2002 | Naor et al. | |
| 6,418,477 B1 * | 7/2002 | Verma | 709/240 |
| 6,421,335 B1 | 7/2002 | Kilkki et al. | |
| 6,424,624 B1 | 7/2002 | Galand et al. | |
| 6,490,248 B1 * | 12/2002 | Shimojo | 370/229 |
| 6,496,513 B1 | 12/2002 | Takamichi | |
| 6,507,567 B1 * | 1/2003 | Willars | 370/321 |
| 6,507,572 B1 | 1/2003 | Kumar et al. | |
| 6,567,420 B1 | 5/2003 | Tiedemann et al. | |
| 6,594,238 B1 | 7/2003 | Wallentin et al. | |
| 6,674,765 B1 | 1/2004 | Chua et al. | |
| 6,765,868 B1 * | 7/2004 | Dunn et al. | 370/230 |

FOREIGN PATENT DOCUMENTS

| | | |
|---|---|---|
| EP | 0798943 | 10/1997 |
| EP | 0877512 | 11/1998 |
| EP | 0912015 | 4/1999 |
| EP | 0912015 | 5/1999 |
| EP | 0977393 | 2/2000 |
| JP | H345051 | 2/1991 |
| WO | 9608935 | 3/1996 |
| WO | 9622666 | 7/1996 |
| WO | 9725825 | 7/1997 |
| WO | 9816036 A1 | 4/1998 |
| WO | 9833349 | 7/1998 |
| WO | 9847253 | 10/1998 |
| WO | 9909775 | 2/1999 |

OTHER PUBLICATIONS

InterDigital, "FACH Scheduling, Prioritization and Queue Management", May 25-28, 1999, 3GPP TSG RAN WG2 #4, pp. 1-7.*

3G TS 25.425 "Technical Specification Group Radio Access Network; Utran $I_{ur}$ Interface User Plane Protocols for Common Transport Channel Data Streams", 3$^{rd}$ Generation Partnership Project, V3.1.0 (Mar. 2000); Release 1999.

Third Generation Partnership Project, "Technical Specification Group Radio Access Network; Utran Iur interface user plane protocols for Common Transport Channel data streams," 3GPP TS 25.425. V0.1.0 (Feb. 1999).

Third Generation Partnership Project, "Technical Specification Group Radio Access Network; Radio resource management strategies (Release 1999), "0 3 GPP TR 25.922 V3. 1.0 (Mar. 2000).

TSGR3#3(99)286, "Report of [ARC/1] Study Item 'Common Transport Channels (FACH, RACH, DSCH) on Iur'" (Draft), TSG-RAN Working Group 3 (Architecture), Kawasaki, Japan, Apr. 26,30, 1999, pp. 1-5.

3G TS 25.425 "Technical Specification Group Radio Access Network; UTRAN1$_{ur}$ Interface User Plane Protocols for Common Transport Channel Data Streams", 3rd Generation Partnership Project, V3.1.0 (Mar. 2000); Release 1999.

Aldama et al, "Outage Effects on the TCP-Wireless Integration for Data/Voice Services in CDMA Systems Using Multiple Access," IEEE 49$^{th}$ Vehicular Technology Conference, May 16-20, 1999, vol. 2. pp. 1717-1721.

Chao et al., "Queue Management with Multiple Delay and Loss Priorities for ATM Switches," IEEE International Conference on Communications, 1994, ICC 94, Supercomm. New Orleans, LA, May 1-5, 1994, vol. 2, pp. 1184-1189.

Liebeherr et al., "Priority Queue Schedulers with Approximate Sorting in Output-Buffered Switches," IEEE Journal on Selected Areas in Communications, Charlottesville, VA, Jun. 1999, vol. 17, Iss. 6, pp. 1127-1144.

Okada et al., "CDMA Unslotted Aloha System with Finite Buffers," IEEE International Universal Personal Communications, Oct. 5-9, 1998, vol. 2, pp. 1143-1147.

Prasad et al., "An Overview of CDMA Evolution toward Wideband CDMA," IEEE Communications Surveys, pp. 2-29 (1998).

Terry, FACH Scheduling, Prioritization and Queue Management, 3GPP TSG-RAN WG2 #4, Berlin, Germany, May 25-28, 1999.

Third Generation Partnership Project, "Technical Specification Group Radio Access Network; UTRAN Iur interface user plane protocols for Common Transport Channel data streams," 3GPP TS 25.425 V0.1.0 (Feb. 1999).

Third Generation Partnership Project, "Technical Specification Group Radio Access Network; Radio Resource Control (RRC); Protocol Specification (Release 1999)," 3GPP TS 25.331 V1.0.0 (Apr. 1999).

Third Generation Partnership Project, "Technical Specification Group Radio Access Network; Radio Resource Control (RRC); Protocol Specification (Release 1999)," 3GPP TS 25.331 V3.2.0 (Mar. 2000).

Third Generation Partnership Project, "Technical Specification Group Radio Access Network; MAC Protocol Specification (Release 1999)," 3GPP TS 25.321 v3.3.0 (Mar. 2000).

Third Generation Partnership Project, "Technical Specification Group Radio Access Network; Radio interface protocol architecture (Release 1999)," 3GPP TS 25.301 V 3.4.0 (Mar. 2000).

Third Generation Partnership Project, "Technical Specification Group Radio Access Network; Radio interface protocol architecture (Release 1999)," 3GPP TS 25.301 V 3.0.0 (Apr. 1999).

Third Generation Partnership Project, "Technical Specification Group Radio Access Network; Radio resource management strategies (Release 1999)," 3GPP TR 25.922 V0.1.1 (Apr. 1999).

Third Generation Partnership Project, "Technical Specification Group Radio Access Network; Radio resource management strategies (Release 1999)," 3GPP TR 25.922 V3.1.0 (Mar. 2000).

Third Generation Partnership Project, "Technical Specification Group Radio Access Network; UTRAN Overall Description (Release 1999)," 3GPP TS 25.401 V1.0.0 (Apr. 1999).

Third Generation Partnership Project, "Technical Specification Group Radio Access Network; UTRAN Overall Description (Release 1999)," 3GPP TS 25.401 V3.2.0 (Mar. 2000).

Third Generation Partnership Project, "Technical Specification Group Services and System Aspect; QoS Concept and Architecture (Release 1999)," 3G TS 23.107 V3.2.0 (Mar. 2000).

Third Generation Partnership Project, "Technical Specification Group Radio Access Network; UTRAN Iub Interface: General Aspecs and Principles (Release 1999)," 3G TS 25.430 V3.1.0 (Mar. 2000).

Third Generation Partnership Project, "Technical Specification Group Radio Access Network; UTRAN Iub Interface NBAP Signaling (Release 1999)," 3G TS 25.433 V3.1.0 (Mar. 2000).

TS 25.321 V2.0 MAC Protocol Specification, TSG-RAN Working Group 2 (Radio Layer 2 and Radio Layer 3), Berlin, Germany, May 25-28, 1999.

TS 25.321 V2.0.0 (Apr. 1999), "MAC Protocol Specification," 3$^{rd}$ Generation Partnership Project (3GPP), Technical Specification Group (TSG) RAN, Working Group 2, 1999.

TSGR3#3(99)286, "Report of [ARC/1] Study Item 'Common Transport Channels (FACH, RACH, DSCH) on Iur,'" (Draft), TSG-RAN Working Group 3 (Architecture), Kawasaki, Japan, Apr. 26-30, 1999, pp. 1-5.

TSGW3#n(99)395, "Draft LS to RAN 2, Common Channel Management Over Iur," TSG-RAN Working Group 3 Meeting #3, Nortel Networks, Kawasaki, Japan, Apr. 26-30, 1999.

Yang et al., "A Taxonomy for Congestion Control Algorithms in Packet Switching Networks," IEEE Network, Jul./Aug. 1995, pp. 34-45.

* cited by examiner

FACH Prioritization 72

| Type | Source | Destination | | Class | Suggested |
|---|---|---|---|---|---|
| | | No Iur | Across Iur | | Priority |
| CCCH (Signaling) | RLC | X | X | Mandatory | Medium |
| DCCH (Signaling) | MAC-d | X | X | Best Effort | Medium |
| DTCH (Traffic) | MAC-d | X | X | Best Effort | Low |
| DSCH (Control) | MAC-sh | X | | Mandatory | Highest |
| USCH (Control) | MAC-sh | X | | Mandatory | Highest |
| H-ARQ (Control) | MAC-d | X | X | Mandatory | High |
| H-ARQ (Control) | MAC-sh | X | | Mandatory | Highest |

FIG. 5

MULTIPLEXING CHANNELS BY A MEDIUM ACCESS CONTROLLER

CROSS REFERENCE TO RELATED APPLICATIONS

This application is a continuation of U.S. patent application Ser. No. 10/832,678, filed Apr. 27, 2004, which is a continuation of U.S. patent application Ser. No. 09/569,731, filed May 12, 2000, which issued on May 18, 2004 as U.S. Pat. No. 6,738,368, which is incorporated by reference as if fully set forth.

BACKGROUND

The invention generally relates to channels used by multiple users in a wireless code division multiple access spread spectrum system. More specifically, the invention relates to a system and method of prioritizing and controlling the flow of data for common and shared channels in a spread spectrum system.

FIG. 1 illustrates a simplified wireless spread spectrum code division multiple access (CDMA) communication system 18. A node b 26 within the system 18 communicates with associated user equipment 20-24 (UE). The node b 26 has a single site controller (SC) 30 associated with either a single (shown in FIG. 1) or multiple base stations 28. A Group of node bs 26, 32, 34 is connected to a radio network controller (RNC) 36. To transfer communications between RNCs 36-40, an interface between the RNCs (IUR) 42 is utilized. Each RNC 36-40 is connected to a mobile switching center (MSC) 44 which in turn is connected to the core network 46.

To communicate within the system 18, many types of communication channels are used, such as dedicated, shared and common. Dedicated channels transfer data between a node b 26 and a particular UE 20-24. Common and shared channels are used by multiple UEs 20-24 or users. All of these channels carry a variety of data including traffic, control and signaling data.

Since shared and common channels carry data for different users, data is sent using protocol data units (PDUs) or packets. As shown in FIG. 2, to regulate the flow of data from differing sources 48-52 into a channel 56, a controller 54 is used.

One common channel used for transmitting data to the UEs 20-24 is the forward access common channel (FACH) 58. As shown in FIG. 3, the FACH 58 originates in an RNC 36 and is sent to a node b 28-34 for wireless transmission as a spread spectrum signal to the UEs 20-24. The FACH 58 carries several data types from various sources, such as a common control channel (CCCH), dedicated control and traffic channel (DCCH and DTCH), and a downlink and uplink share channel (DSCH and USCH) control signaling. The FACH 58 also carries control signaling out of band, such as hybrid automatic repeat request (H-ARQ), and similar data transmitted via the IUR 62 from other RNCs 38-40, such as CCCH, DCCH, DTCH and H-ARQ control data.

Various controllers are used by the RNC 36 to control the flow of data. A radio link controller (RLC) 64 handles the CCCH. The dedicated medium access controller (MAC-d) 66 handles the DCCH, the DTCH and some out of band H-ARQ signaling. The shared medium access controller (MAC-sh) 68 handles the DSCH, USCH control signaling and out of band H-ARQ control signaling. Controlling the FACH 58 is the common medium access controller (MAC-c) 60.

Due to the multiple sources of data 48-52 that can be transmitted over a common or shared channel, the channel controllers 54 queue the data prior to transmission. If a large backlog develops in the queue, data in the queue develops a latency. A large latency of certain data such as control data will result in the failure of a channel. To alleviate this problem, the prior art either flushed the queue to reduce congestion or rerouted the data. Flushing the queue results in the loss of data and requires retransmission which is undesirable. Rerouting data already queued creates a duplication of data within the system and does not resolve the existing congestion. Accordingly, it is desirable to reduce the latency of data for shared and common channels without the problems associated with the prior art.

SUMMARY

A code division multiple access (CDMA) communication device comprises a medium access controller (MAC) configured to receive data from a plurality of channels. Each channel is associated with a priority and an identifier. The MAC is further configured to multiplex the data of the plurality of channels for transmission over a CDMA channel based on the priority.

BRIEF DESCRIPTION OF THE DRAWING(S)

FIG. 5 is a prioritization scheme for use with a FACH channel.

DETAILED DESCRIPTION OF THE PREFERRED EMBODIMENT(S)

Figure 4:
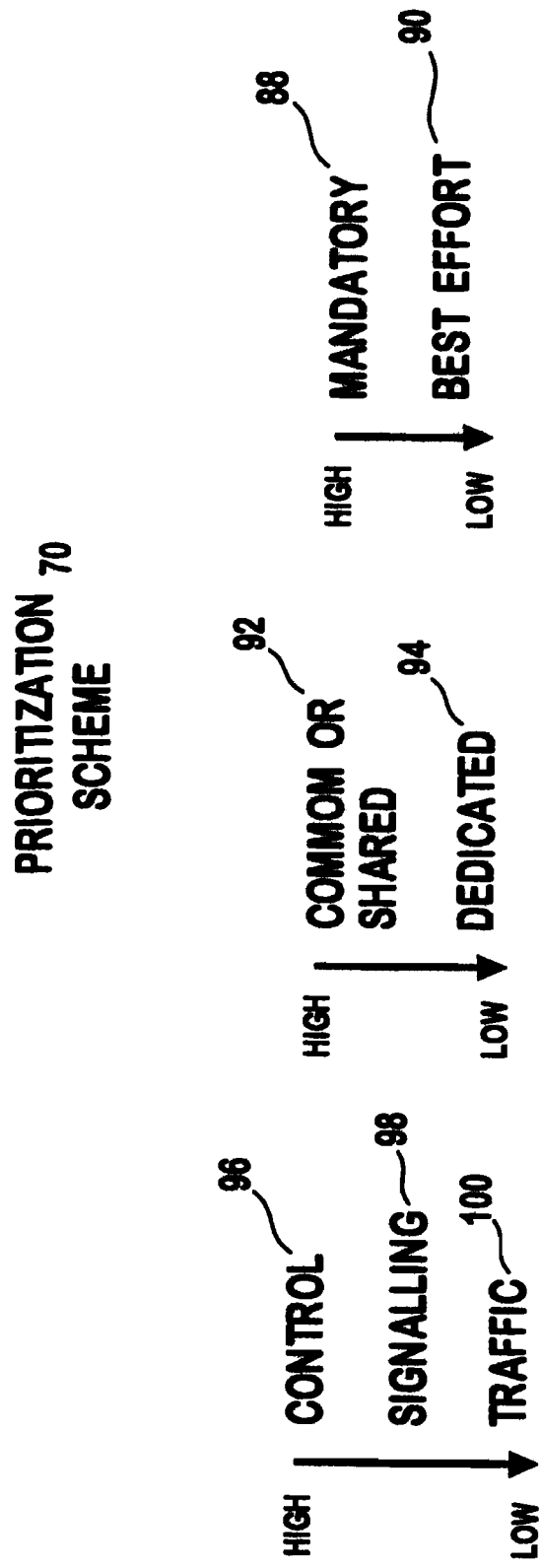
FIG. 4 is an illustration of a prioritization scheme.

Data prioritization 70 is used to reduce data latency in a multiuser channel controller 54 as illustrated in FIG. 4. For a particular common or shared channel, certain data must be transmitted on that channel and is shown in the figure as "mandatory" 88. Other data is preferably sent on the particular channel but may be rerouted to another channel, such as a dedicated channel. This data is referred to as "best effort" 90. Since "mandatory" data 88 is not reroutable, it takes priority over "best effort" data 90.

The type of the data within a packet, such as control 96, signaling 98 and traffic data 100, is also used for prioritization. To accomplish prioritization of the data type, control 96 and signaling 98 data packets are separated from traffic data packets 100. One approach to separating the packets is to group similar data type packets together prior to reception at the controller 54. Alternately, packets sent by each channel prior to reception by the controller 54 are provided with a flag or identifier indicating the packets' data type.

Since a prolonged delay in the transfer of control 96 or signaling 98 data results in a frozen channel, control 96 and signaling 98 data are given a higher priority than traffic data 100. Additionally, data associated with multiple users, common or shared 92, has a higher priority than data for a single user, dedicated 94. The data prioritization scheme is typically stored in the software of the multiuser channel's controller.

During periods of high congestion, data is rerouted to other channels based on its priority 70. For instance, best effort dedicated traffic data is rerouted and mandatory common control data is not. By rerouting data prior to queuing, retransmissions will not be required. Accordingly, the amount of queued data is reduced resulting in lower data latency. Additionally, since the rerouted data is never queued, the duplication of data as experienced in the prior art is eliminated.

A prioritization scheme 72 for use with a FACH 58 is shown in FIG. 5. Since the DSCH, H-ARQ of the MAC-sh have mandatory shared control data, they have the highest priority, highest. Although the H-ARQ of the MAC-d has mandatory control data, being dedicated it is assigned a slightly lower priority, high. The CCCH and DCCH are used for signaling and have the next level of priority, medium. The lowest level of priority is assigned to the DTCH because it has best effort dedicated traffic data.

Figure 1:
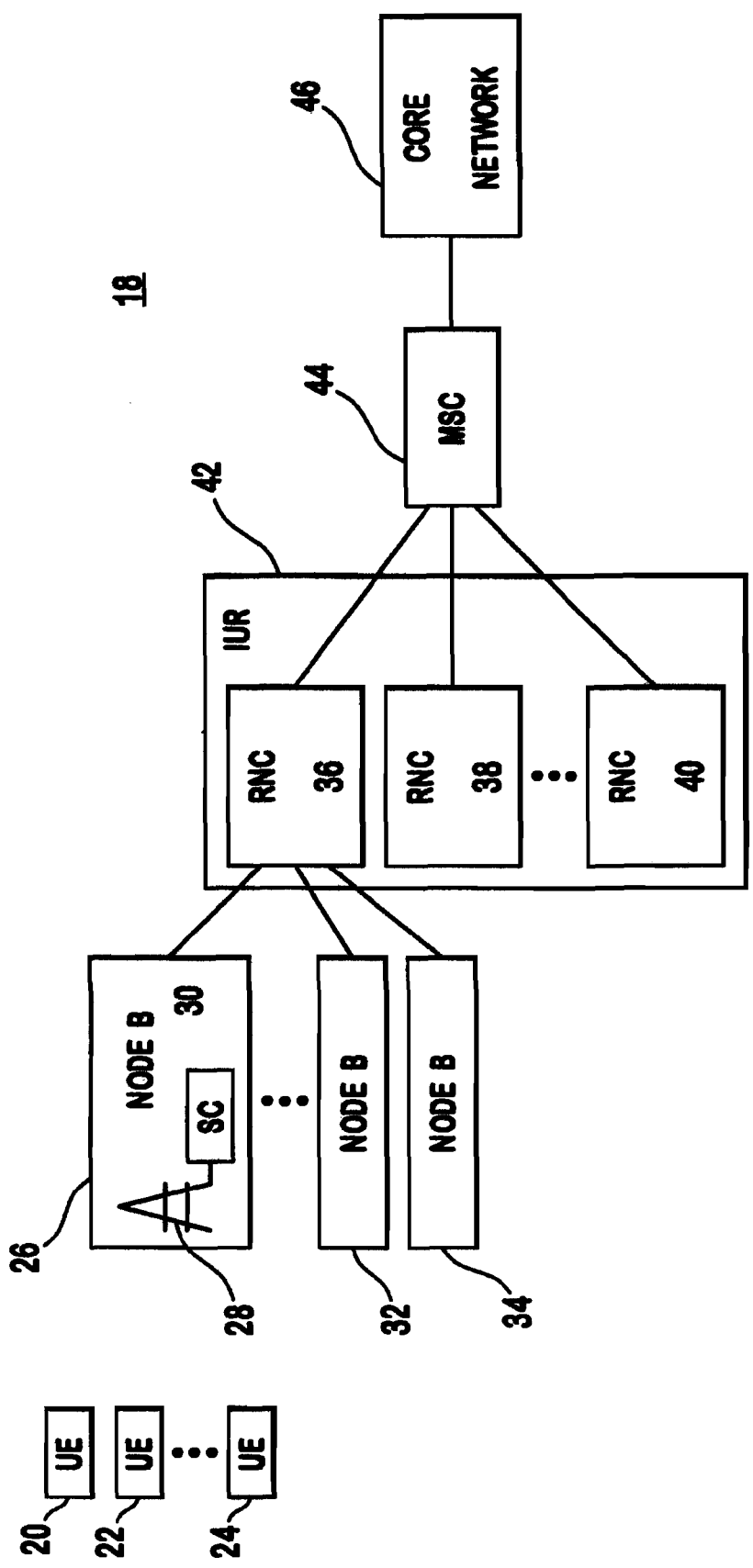
FIG. 1 is a simplified illustration of a wireless spread spectrum communication system.
Figure 2:
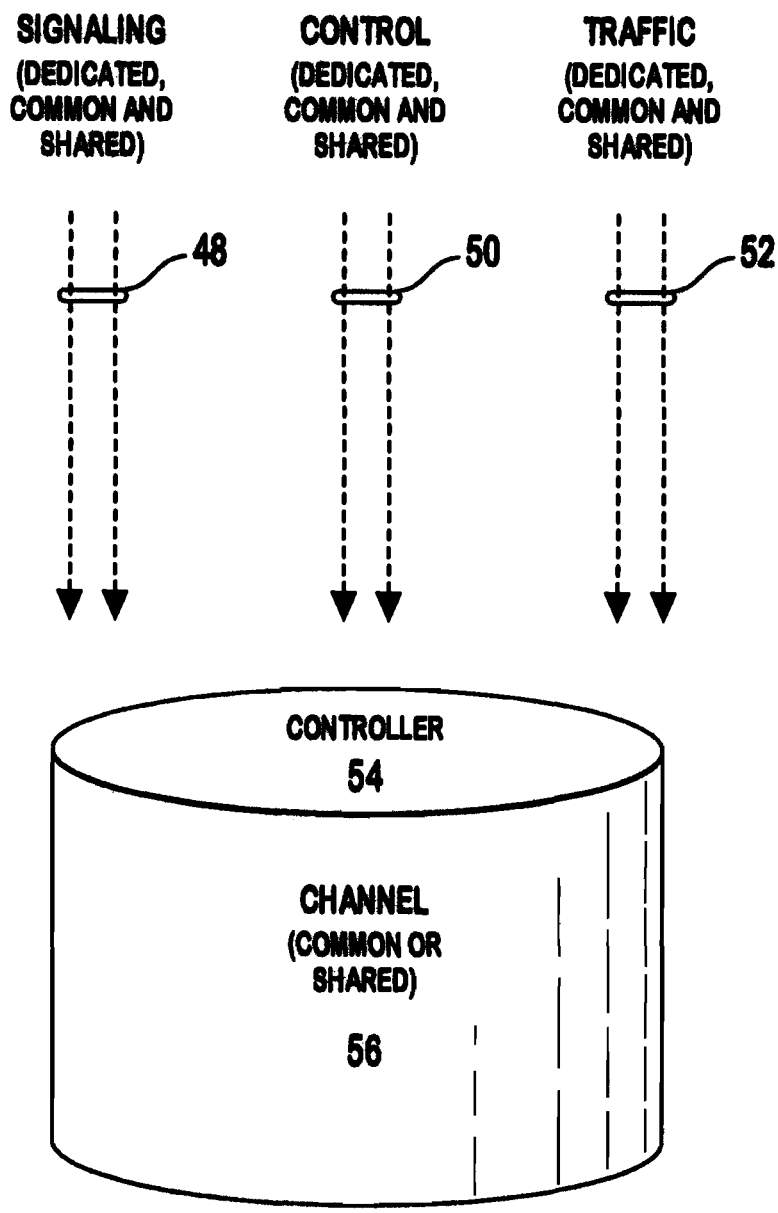
FIG. 2 is an illustration of data flowing into a common or shared channel.
Figure 3:
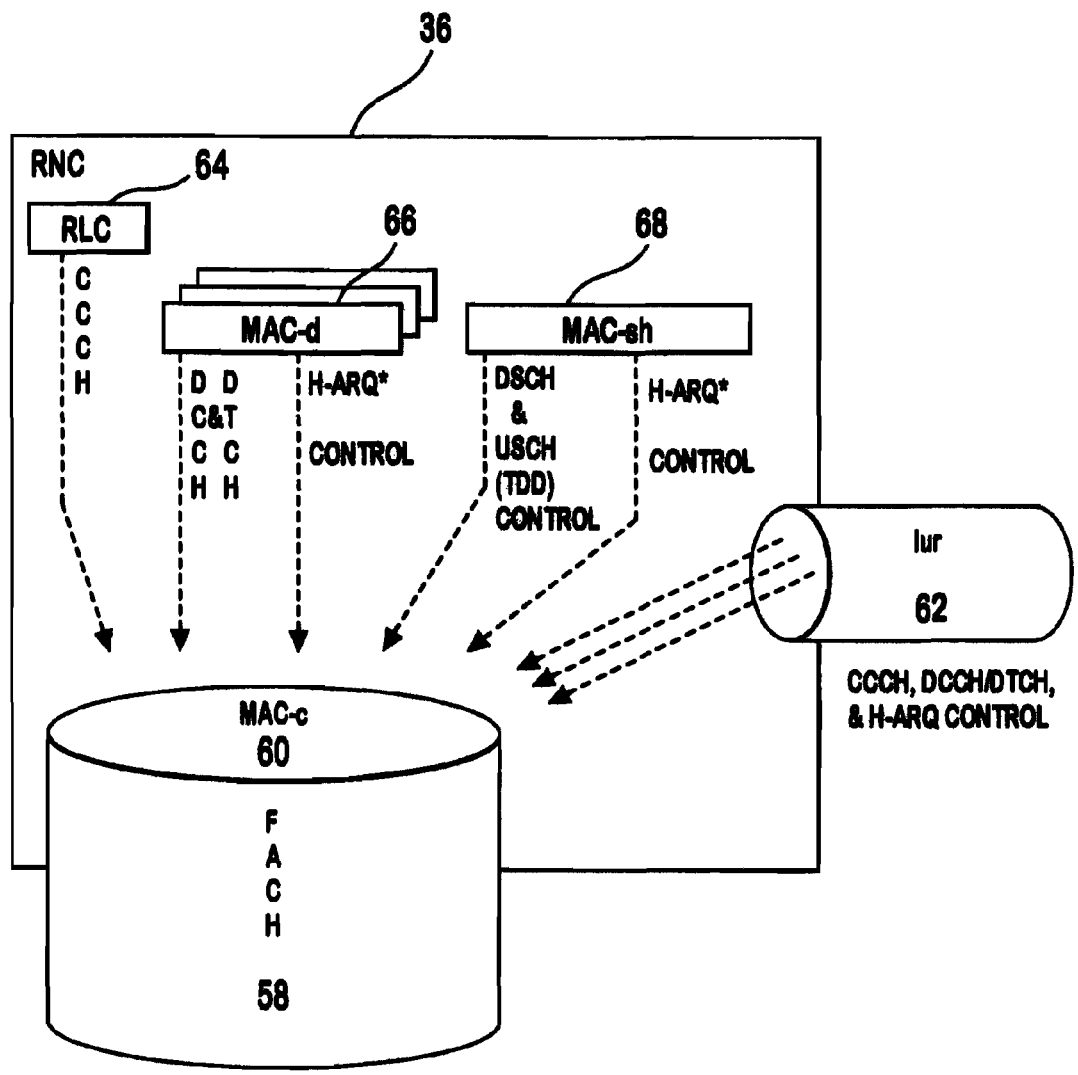
FIG. 3 is an illustration of data flowing into a FACH channel within an RNC.

To facilitate this prioritization scheme 72 for the FACH 58, modifications to the RNC 36 are required. As shown in FIG. 3, the prior art MAC-d 66 controls the DCCH, DTCH and MAC-d's H-ARQ. As shown in FIG. 5, each of these sources has a different priority. Since this data is multiplexed prior to prioritization at the MAC-d 66, the multiplexer of the MAC-d 66 is moved to the MAC-c 60 to allow prioritization at the MAC-c 60. Alternatively, the MAC-d 66 may send the priority and class (mandatory or best effort), such as by a flag or identifier, of each packet of the multiplexed data for prioritization at the MAC-c 60. The data controlled by the RLC 64 and the MAC-sh 68 have equal priority and accordingly, neither requires modification. Using the stored priority list, the data from the various sources is scheduled for transmission and rerouted during periods of high congestion.

Figure 6:
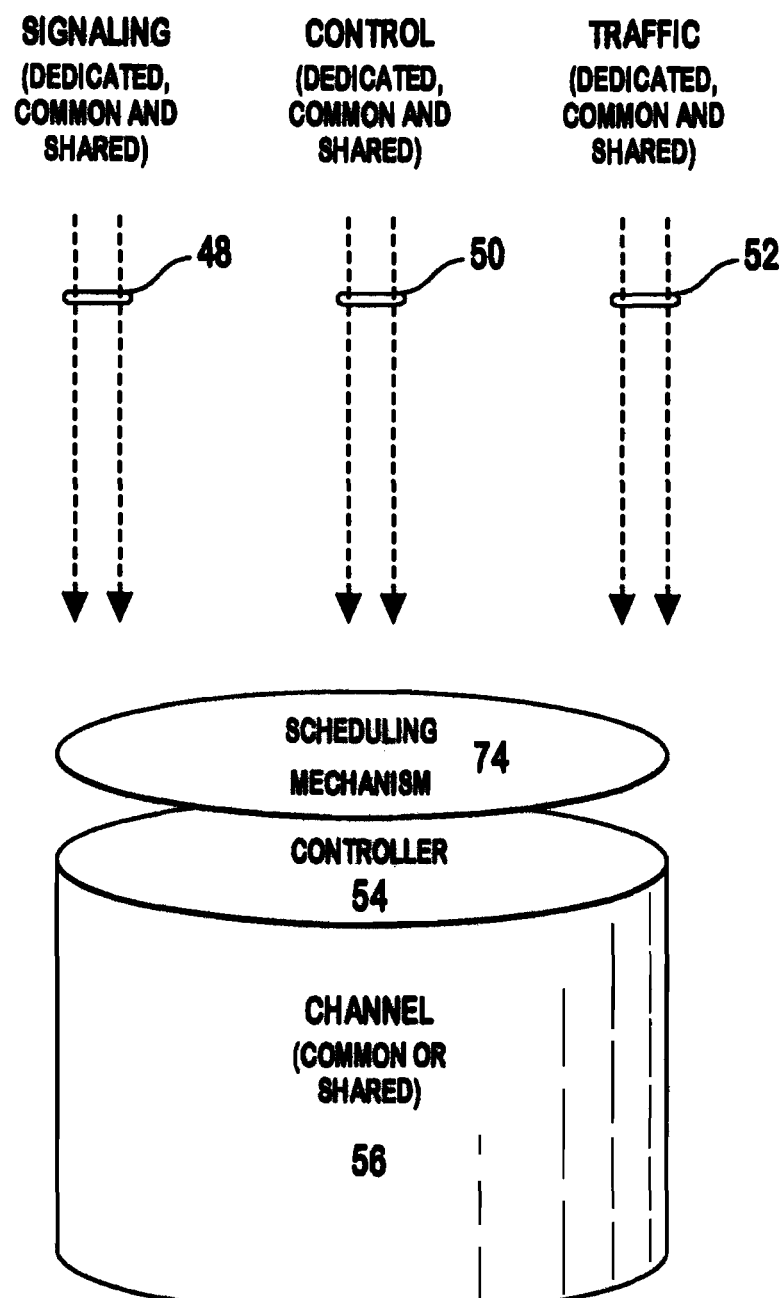
FIG. 6 depicts a reservation mechanism used with a common or shared channel.

Another technique for reducing the latency of data which may be combined with prioritization is to control the flow of data between the various controllers. As shown in FIG. 6, a scheduling mechanism 74 is used to regulate the data entering the common or shared channel 56. The scheduling mechanism 74 tracks the backlog of data in the controller's queue. If the mechanism 74 recognizes congestion and that the data will not be transmitted in a certain period of time, access to the channel 56 limits the flow of data from the individual data sources. The individual sources will recognize the need to reroute data or to not attempt transmission. Using a flow control mechanism with a FACH, MAC and RLC (Layer 2), the latency of signaling is decreased thus increasing efficiency.

Figure 7:
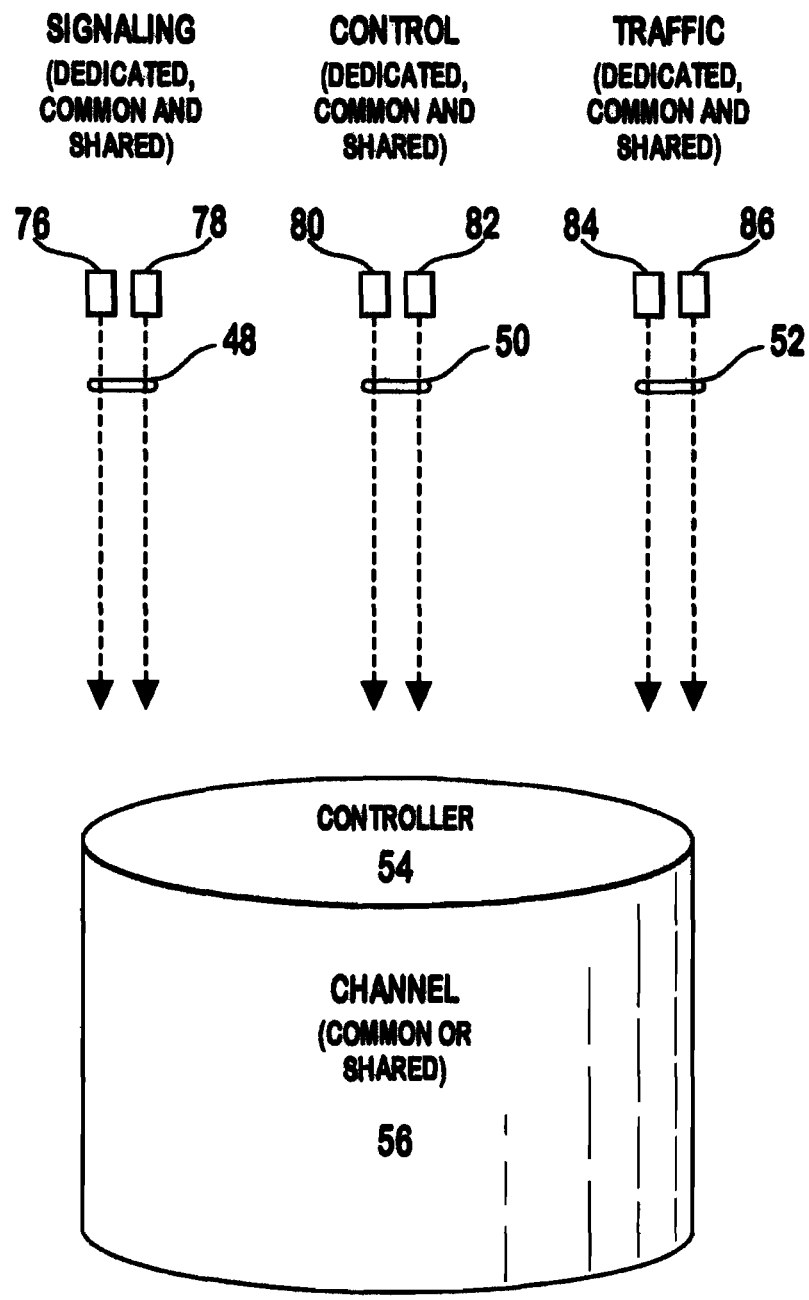
FIG. 7 depicts data source windows used with a common or shared channel.

To prevent the monopolization of the common or shared channel 56 by one data source 48-52 variable windows 76-86 may be used as shown in FIG. 7. Each data source 48-52 has a window or multiple windows 76-86 of outstanding data in the queue that it is permitted. The size of the window 76 is based on the requirements of the specific source. The window 76 is dynamically adjusted in response to the availability of the queue. As the availability of the channel increases, the size of the windows increase which increases the number of outstanding packets. Conversely, as the availability decreases, the size of the windows decrease which decreases the number of outstanding packets. As a result of the decreased windows, the data sources either reroute or stop sending packets to the windows.

What is claimed is:

1. A communication device comprising:
a medium access controller (MAC) configured to receive data from a plurality of channels; wherein each channel is associated with a priority, where mandatory data is assigned a higher priority than best effort data, and is provided with a dynamically adjusted parameter which indicates a size limit of an amount of data for multiplexing for that channel to prevent monopolization of a shared channel by one of the plurality of channels; wherein the MAC is further configured to multiplex the data of the plurality of channels for transmission over the shared channel based on the priority, wherein H-ARQ control information is multiplexed onto the shared channel and the H-ARQ control information is multiplexed regardless of the priority of the plurality of channels.

2. The communication device of claim 1 wherein the priority is based on whether the data is best effort or not best effort.

3. The communication device of claim 1 wherein the medium access controller (MAC) is configured to receive hybrid automatic repeat request (H-ARQ) signaling.

4. The communication device of claim 1 wherein each channel is associated with a dedicated traffic channel (DTCH) data flow.

5. The communication device of claim 1 wherein the communication device is a radio network controller.

6. The communication device of claim 1 wherein the medium access controller (MAC) is configured to receive data for the plurality of channels from a dedicated medium access controller (MAC-d).

7. The communication device of claim 1 wherein the medium access controller (MAC) is a common medium access controller (MAC-c) or a shared medium access controller (MAC-sh).

8. A communication device comprising:
at least one component device configured to implement a medium access control (MAC) function; wherein the MAC function receives data from a plurality of channels; wherein each channel is associated with a priority, where mandatory data is assigned a higher priority than best effort data, and is provided with a dynamically adjusted parameter which indicates a size limit of an amount of data for multiplexing for that channel to prevent monopolization of a shared channel by one of the plurality of channels; wherein the MAC function multiplexes the data of the plurality of channels for transmission over the shared channel based on the priority, wherein H-ARQ control information is multiplexed onto the shared channel and the H-ARQ control information is multiplexed regardless of the priority of the plurality of channels.

9. The communication device of claim 8 wherein the priority is based on whether the data is best effort or not best effort.

10. The communication device of claim 8 wherein the medium access controller (MAC) function receives hybrid automatic repeat request (H-ARQ) signaling.

11. The communication device of claim 8 wherein each channel is associated with a dedicated traffic channel (DTCH) data flow.

12. The communication device of claim 8 wherein the medium access controller (MAC) function receives data for the plurality of channels from a dedicated medium access controller (MAC-d) function.

13. The communication device of claim 8 wherein the medium access controller (MAC) function is a common medium access controller (MAC-c) function or a shared medium access controller (MAC-sh) function.

14. The communication device of claim 8 wherein the communication device is a radio network controller.

15. A communication device comprising:
receiving data from a plurality of channels by a medium access controller (MAC) of the communication device;

wherein each channel is associated with a priority, where mandatory data is assigned a higher priority than best effort data, and is provided with a dynamically adjusted parameter which indicates a size limit of an amount of data for multiplexing for that channel to prevent monopolization of a shared channel by one of the plurality of channels; and multiplexing the data of the plurality of channels by the MAC for transmission over the shared channel based on the priority, wherein H-ARQ control information is multiplexed onto the shared channel and the H-ARQ control information is multiplexed regardless of the priority of the plurality of channels.

16. The communication device of claim 15 wherein the priority is based on whether the data is best effort or not best effort.

17. The communication device of claim 15 wherein the medium access controller (MAC) is configured to receive hybrid automatic repeat request (H-ARQ) signaling.

18. The communication device of claim 15 wherein each channel is associated with a dedicated traffic channel (DTCH) data flow.

19. The communication device of claim 15 wherein the communication device is a radio network controller.

20. The communication device of claim 15 wherein the medium access controller (MAC) is configured to receive data for the plurality of channels from a dedicated medium access controller (MAC-d).

21. The communication device of claim 15 wherein the medium access controller (MAC) is a common medium access controller (MAC-c) or a shared medium access controller (MAC-sh).

* * * * *